(12) United States Patent
Ertl

(10) Patent No.: US 11,487,746 B2
(45) Date of Patent: Nov. 1, 2022

(54) BUSINESS IMPACT ANALYSIS

(71) Applicant: Dynatrace LLC, Waltham, MA (US)

(72) Inventor: Otmar Ertl, Linz (AT)

(73) Assignee: Dynatrace LLC, Waltham, MA (US)

(*) Notice: Subject to any disclaimer, the term of this patent is extended or adjusted under 35 U.S.C. 154(b) by 275 days.

(21) Appl. No.: 16/902,497

(22) Filed: Jun. 16, 2020

(65) Prior Publication Data

US 2020/0409933 A1 Dec. 31, 2020

Related U.S. Application Data

(60) Provisional application No. 62/868,304, filed on Jun. 28, 2019.

(51) Int. Cl.
| | |
|---|---|
| *G06F 16/23* | (2019.01) |
| *G06F 16/25* | (2019.01) |
| *G06F 11/30* | (2006.01) |
| *G06F 11/34* | (2006.01) |
| *G06Q 10/06* | (2012.01) |
| *H04L 41/12* | (2022.01) |
| *H04L 41/0686* | (2022.01) |
| *H04L 67/75* | (2022.01) |

(52) U.S. Cl.
CPC ...... *G06F 16/2365* (2019.01); *G06F 11/3006* (2013.01); *G06F 11/3495* (2013.01); *G06F 16/252* (2019.01); *G06Q 10/06375* (2013.01); *H04L 41/12* (2013.01); *H04L 41/0686* (2013.01); *H04L 67/75* (2022.05)

(58) Field of Classification Search
None
See application file for complete search history.

(56) References Cited

U.S. PATENT DOCUMENTS

| | | | |
|---|---|---|---|
| 8,332,271 B1 | 12/2012 | Wilder et al. | |
| 10,083,073 B2 | 9/2018 | Ambichl et al. | |
| 11,366,842 B1* | 6/2022 | Swaminathan | G06N 5/022 |
| 2008/0222068 A1* | 9/2008 | Bahl | G06N 5/043 |
| | | | 706/46 |
| 2013/0297767 A1 | 11/2013 | Kozine et al. | |

(Continued)

*Primary Examiner* — Irene Baker
(74) *Attorney, Agent, or Firm* — Harness, Dickey & Pierce, P.L.C.

(57) ABSTRACT

A system and method is disclosed for identifying and evaluating the business relevant impact of observed operating anomalies of monitored components of computing environments like data centers or cloud computing environments. The disclosed technology uses end-to-end transaction trace, availability and resource utilization data in combination with topology data received from agents deployed to the monitored computing environment. An abnormal operating condition is localized within a topological model of the monitored environment and has a defined temporal extent. On detection of an anomaly, affected transaction traces are selected that used the topology entity on which the anomaly was observed while the anomaly existed. Those transactions are then traced backwards, until a topology entity is reached that represents an entry point of monitored system. The affected transactions are compared with unaffected transactions that entered via the entry point to determine the extent to which the entry service is affected by the abnormal behavior.

21 Claims, 12 Drawing Sheets

(56) References Cited

U.S. PATENT DOCUMENTS

| | | | |
|---|---|---|---|
| 2015/0074035 A1* | 3/2015 | Narasappa | G06N 7/005 |
| | | | 706/52 |
| 2016/0105350 A1* | 4/2016 | Greifeneder | H04L 67/1001 |
| | | | 709/224 |
| 2017/0075749 A1* | 3/2017 | Ambichl | G06F 11/0748 |
| 2018/0123922 A1 | 5/2018 | Nataraj et al. | |
| 2020/0042426 A1 | 2/2020 | Ambichl et al. | |
| 2020/0106660 A1* | 4/2020 | Kakani | H04L 41/0645 |
| 2020/0409822 A1* | 12/2020 | Balasubramanian | |
| | | | G06F 11/302 |

* cited by examiner

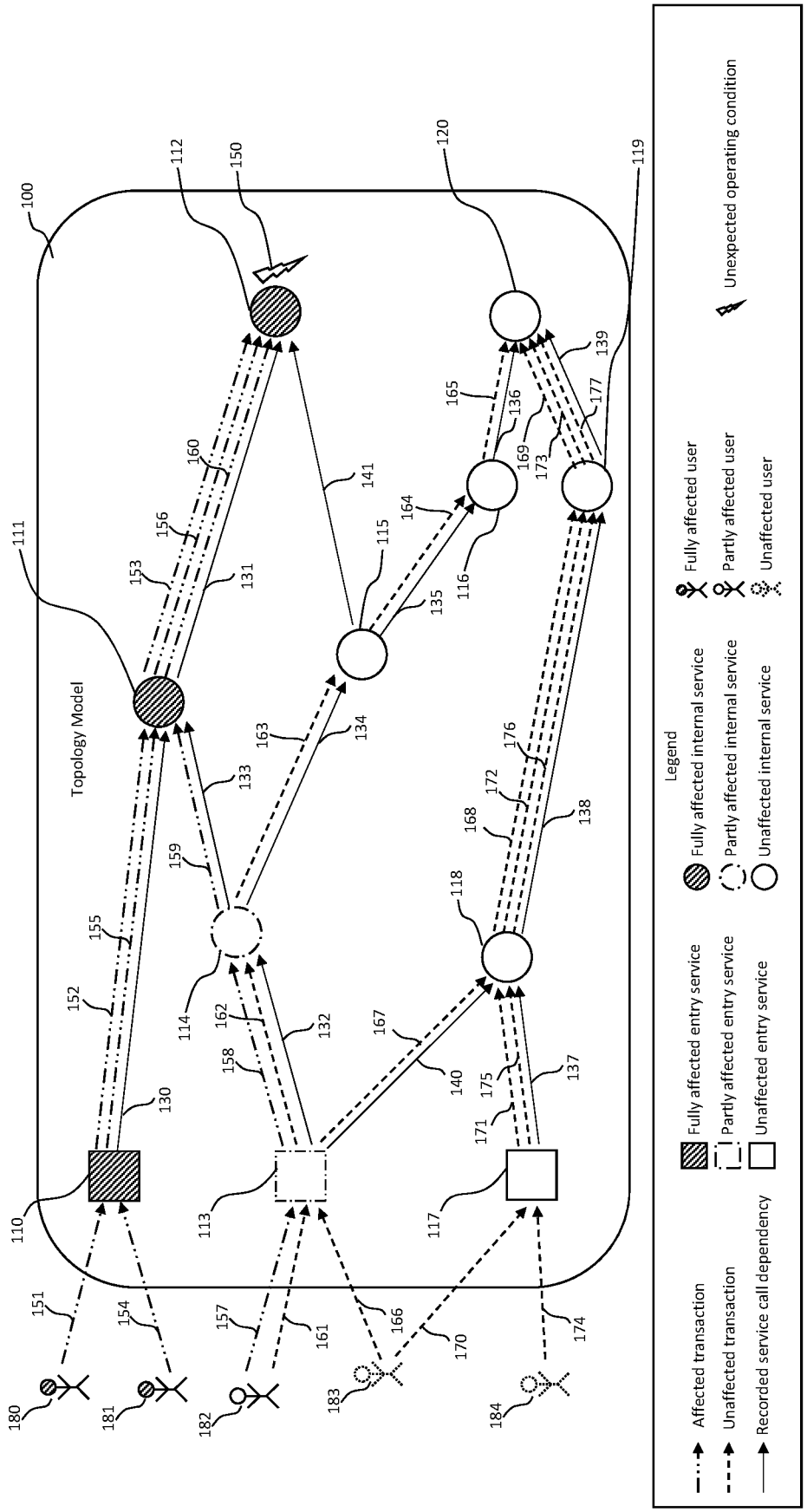

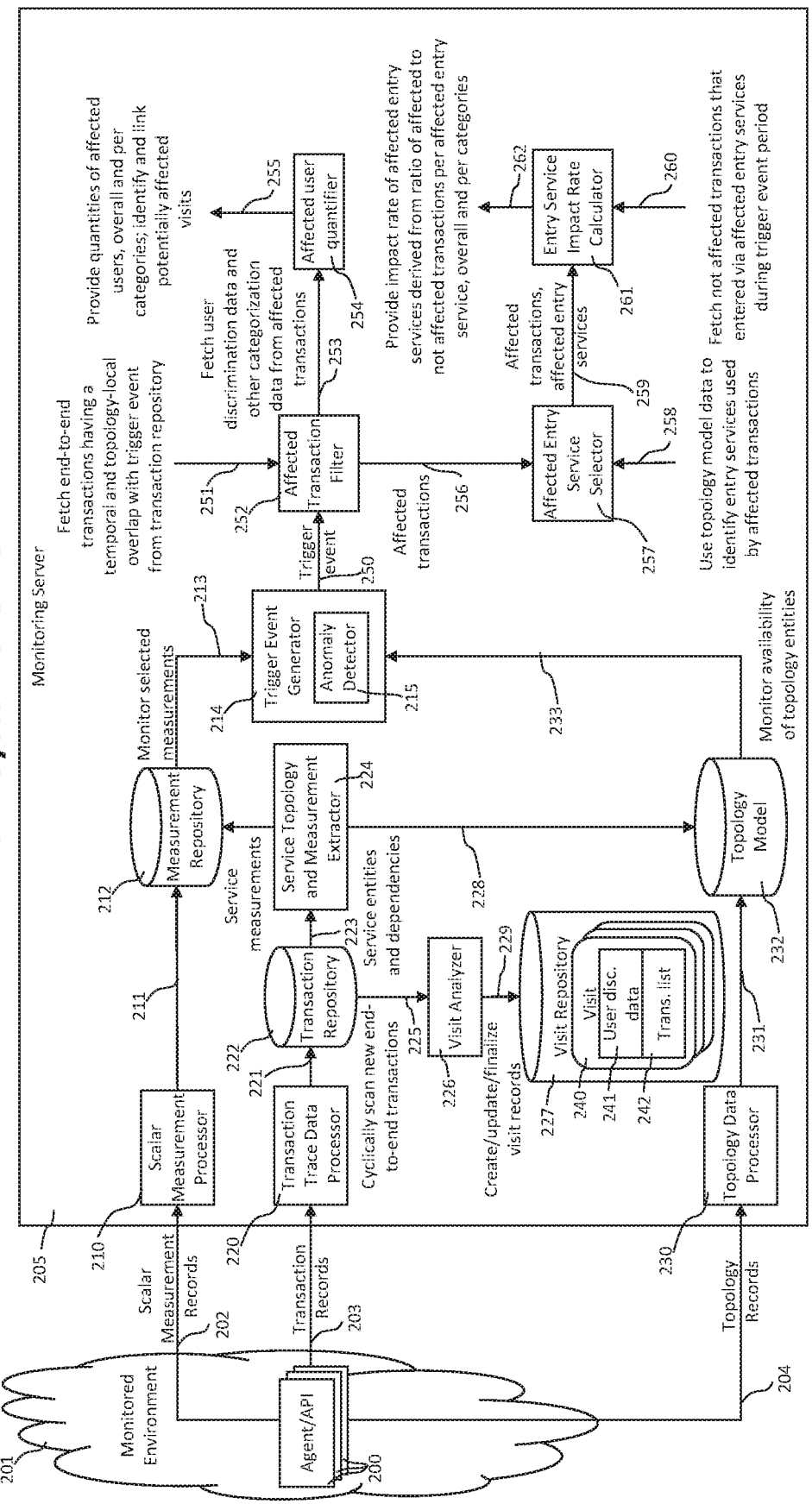
FIG 2: System Overview

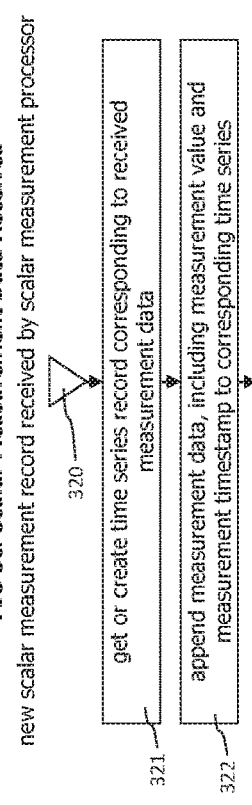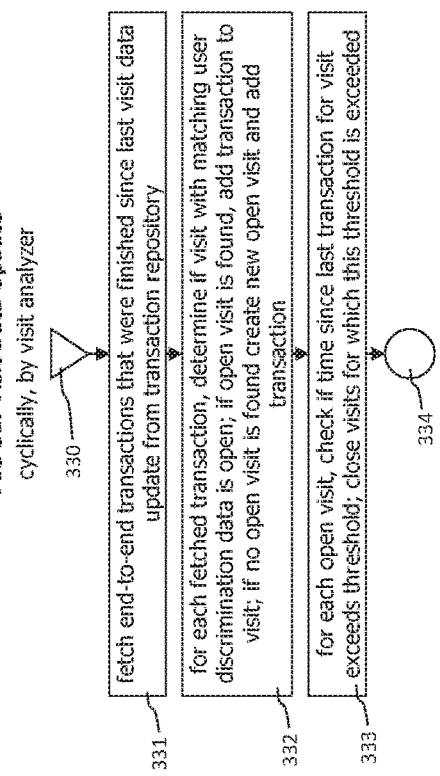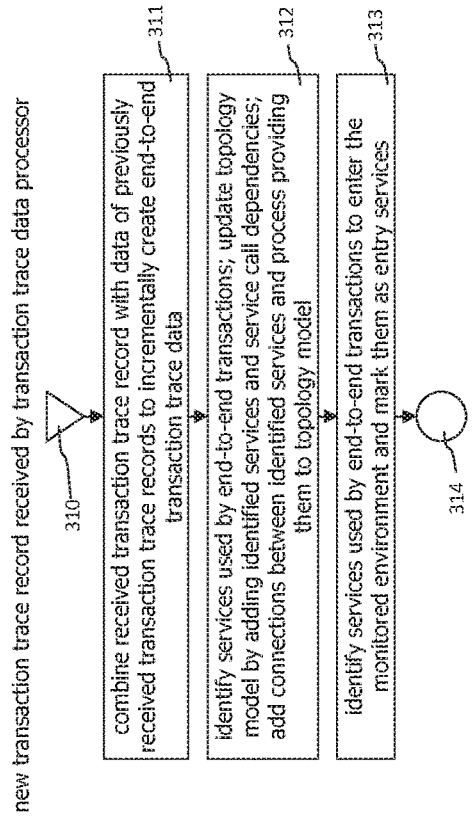
FIGs 3A-D: Processing of received Agent Data

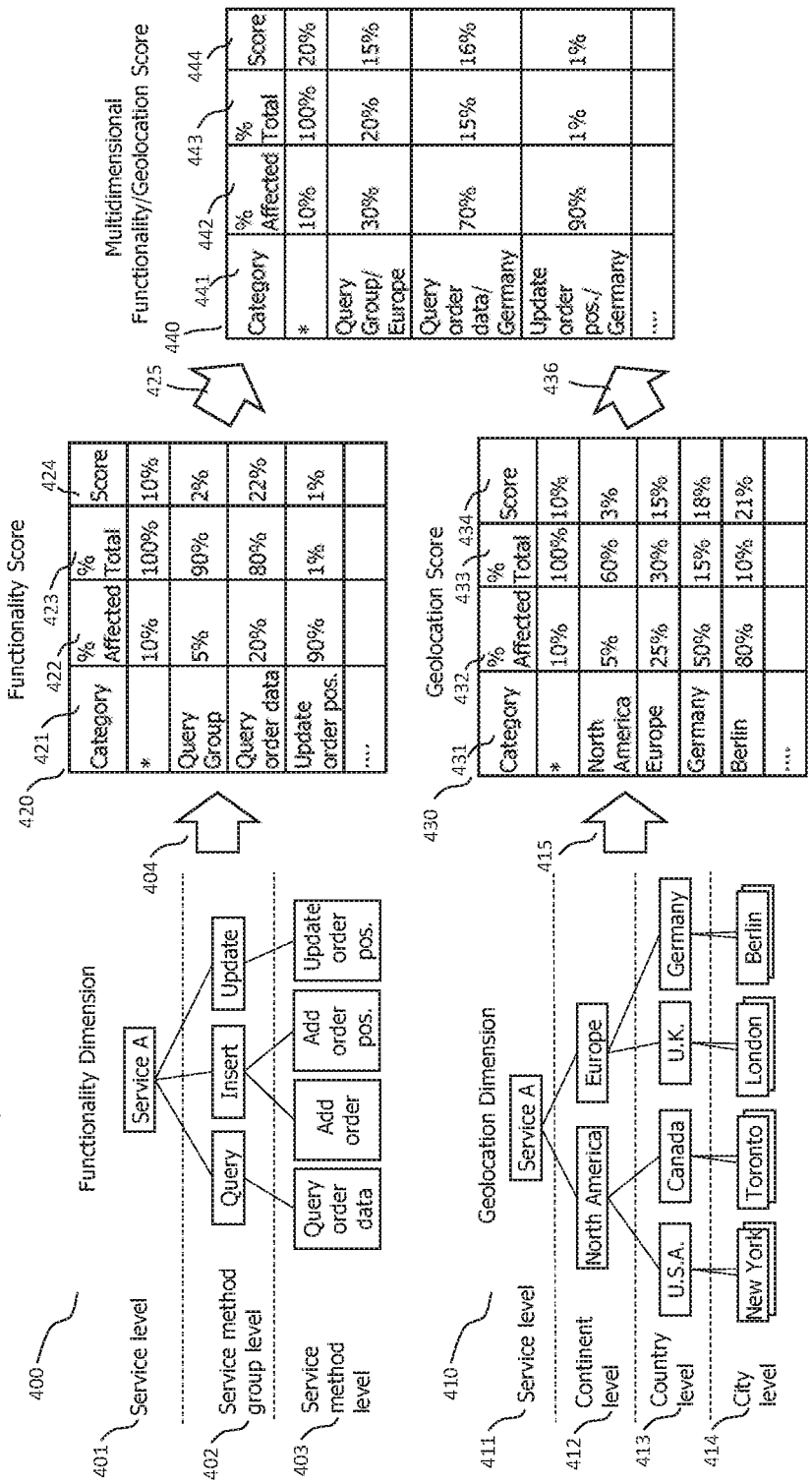

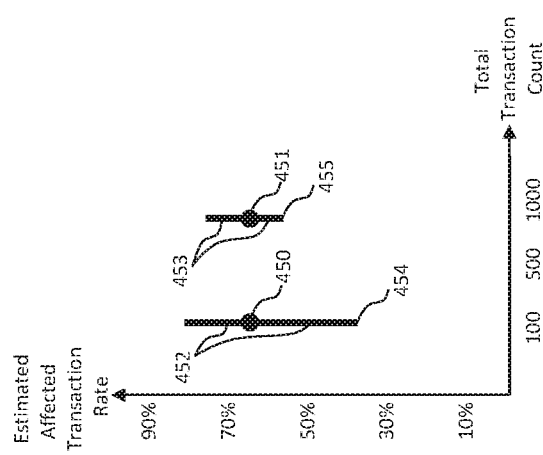
FIGs 4C: Impact score calculation based on lower bound of confidence interval

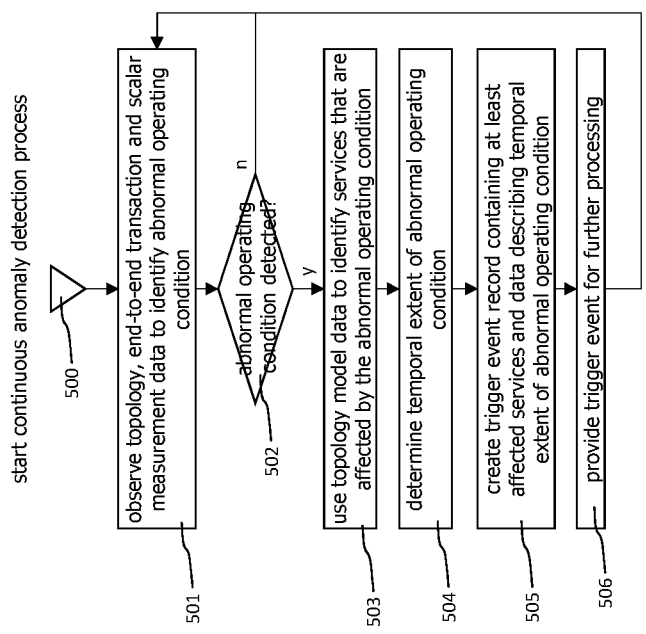
FIG 5: Trigger Event Generation

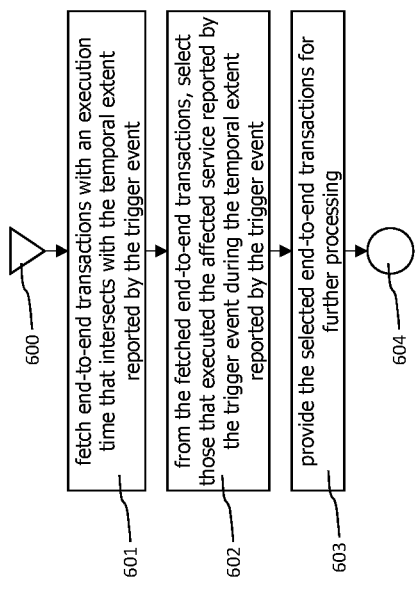
FIG 6: Identification of Affected Transactions

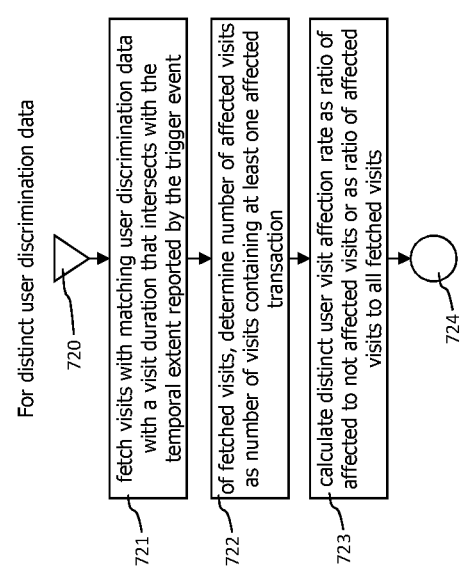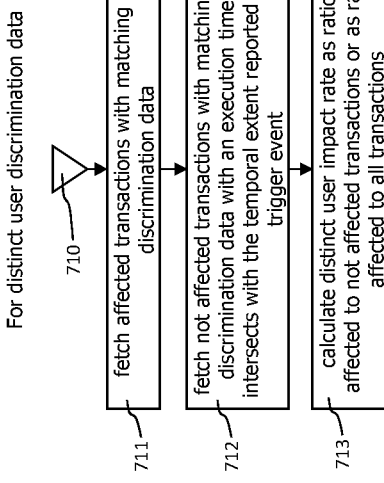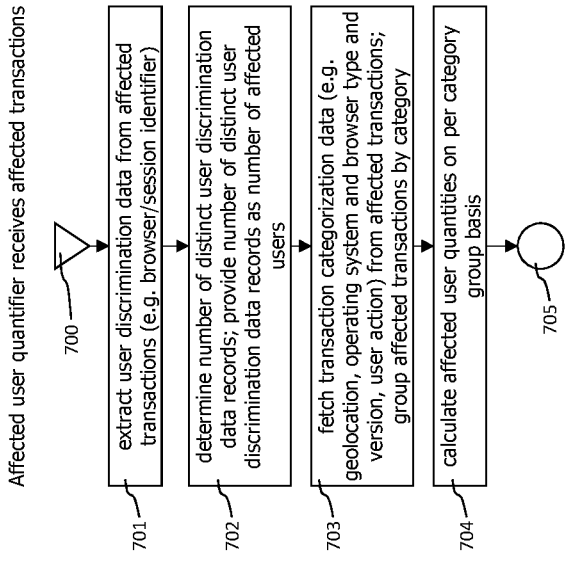
FIGS 7A-C: Calculation of User Impact Data

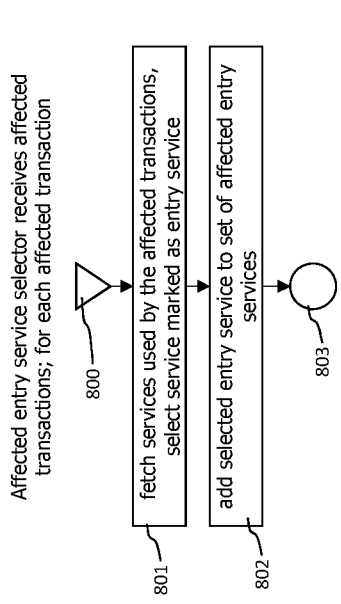
FIG 8: Identification of Affected Entry Services

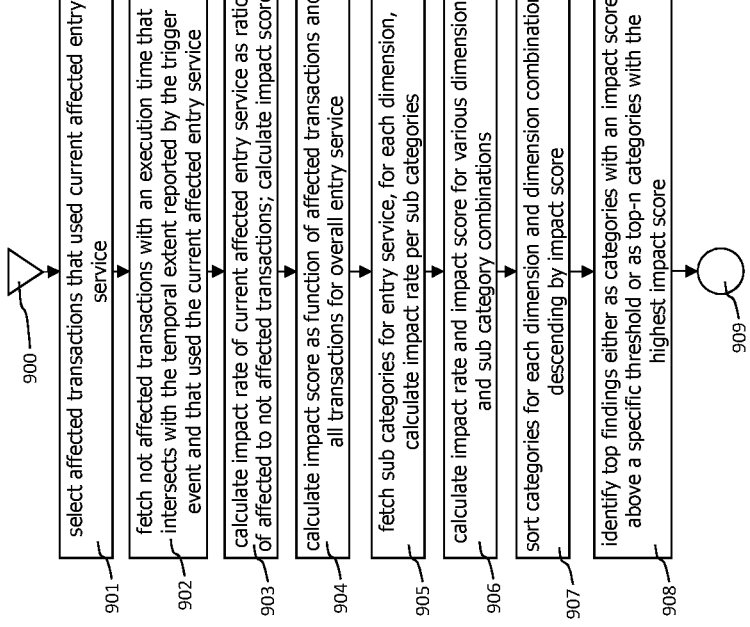

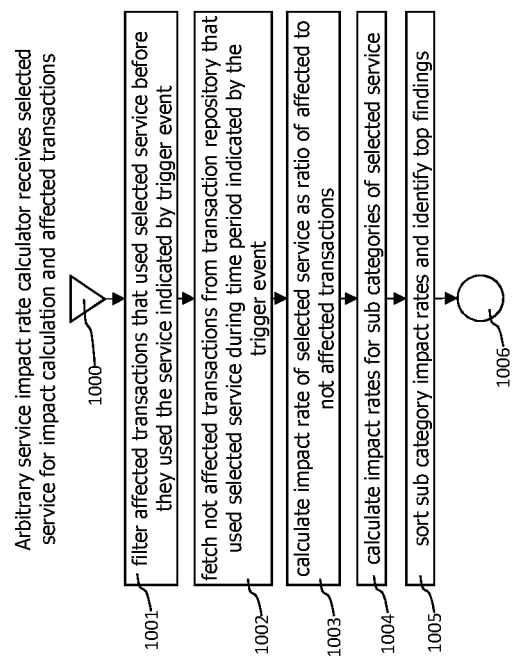
FIG 10: Impact Calculation for Arbitrary Services

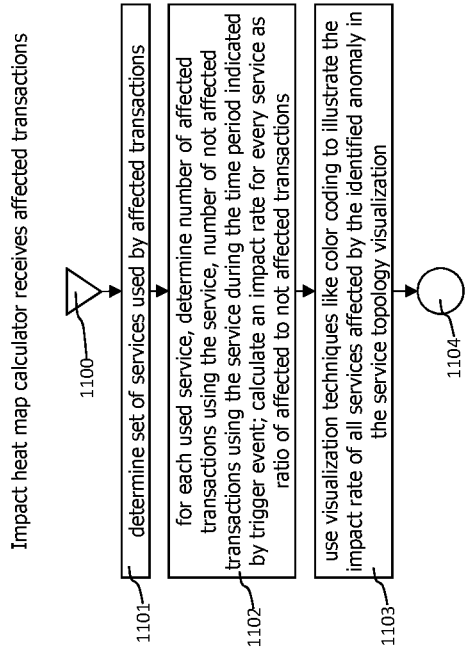
FIG 11: Variant Service Impact Heat Map

BUSINESS IMPACT ANALYSIS

CROSS-REFERENCE TO RELATED APPLICATIONS

This application claims the benefit of U.S. Provisional Application No. 62/868,304 filed on Jun. 28, 2019. The entire disclosure of the above application is incorporated herein by reference.

FIELD OF THE INVENTION

This invention generally relates to determining the impact that identified abnormal operating conditions located on computing environment have on business operation and more specifically to trace transactions that are affected by an abnormal operating condition back to the users that triggered the affected transactions to identify and quantify affected users.

BACKGROUND

Monitoring and visibility of current operating conditions has gained more and more importance for the operation of modern, large-scaled web-based applications, as even short outages, performance or functionality degradations may cause considerable economic impact. To improve flexibility and scalability, such large-scale applications are typically designed according to the service-oriented architecture (SOA) paradigm. In such applications, the overall business functionality is typically split up into smaller parts which are implemented relatively independent building blocks called services. Individual services may execute on separate execution environments, like processes, and provide remote accessible interfaces. A network of loosely connected instances of those services that communicate via network connections provides the overall functionality of the application. Benefits of this architecture include higher flexibility, as individual services may be patched/updated independently and better scalability, as individual services may independently scaled out to run on additional execution environments, depending on changed load situations. The downside of gained the flexibility and scalability is an increased communication complexity, which brings new challenges for performance and availability monitoring systems operating in such environments. The effects of performance or functionality degradations that occurring on specific services may quickly be propagated to other services and cause similar effects there. Therefore, it becomes vital for monitoring systems to identify and report such interdependencies.

Existing solutions already provide functionalities to identify, for a given observed degradation, the chain of, maybe remotely situated, other observer degradations that are causally related, back to the root cause of all observed degradations. This additional causality related information greatly improves the efficiency of applied countermeasures, as they may be performed with focus on the root cause of the identified problem chain. An exemplary causality identifying monitoring systems is e.g. described in U.S. Pat. No. 10,083,073 "Method and System for Real-Time Causality and Root Cause Determination of Transaction and Infrastructure related Events provided by Multiple, Heterogeneous Agents" by E. Ertl et al. or U.S. patent application Ser. No. 16/519,428 (U.S. Pub. No. 2020/0042426, dated Feb. 6, 2020) "Method And System For Automatic Real-Time Causality Analysis Of End User Impacting System Anomalies Using Causality Rules And Topological Understanding Of The System To Effectively Filter Relevant Monitoring Data" by H. Moser et al.

However, those existing approaches only consider the need of fast root cause identification of observed problems to support fast, efficient and focused countermeasures. They fail to provide information about the impact those degradations may have, e.g. on user interfaces provided by the monitored application or about the number and distribution of users of the monitored application that are affected by those degradations.

Consequently, a system and method is desired in the art that overcomes above limitations.

This section provides background information related to the present disclosure which is not necessarily prior art.

SUMMARY

This section provides a general summary of the disclosure, and is not a comprehensive disclosure of its full scope or all of its features.

The present disclosure is directed to a method and system to determine the impact that detected abnormal operating conditions on components of a monitored computing system may have on users of the monitored computing system by analyzing transaction trace data describing transactions that are executed by those users.

Various agents may be deployed to a monitored system which provide multiple types of monitoring data describing the monitored system. The provided monitoring data may include topological data, which describes the services the monitored system consists of together with the call dependencies of those services. Service call dependencies may e.g. describe the sequence of services that are called to execute transactions that provide valuable results for customers. The topology model may identify entry services of the monitored system that represent the interfaces of the monitored environment that are directly accessible for the end users of the system. As an example, such entry services may, for web-based applications, HTTP services provided by web servers that are reachable from outside the monitored system. Next to topology data, the deployed agents may also provide transaction trace data which describes portions of transactions executed by the monitored system. The trace data portions may be combined to create end-to-end transaction data that describes individual transactions from the user that initiated the transaction, over a web service used to enter the monitored system, various internal services used to provide the business logic of the application and eventually to a data base providing and storing data required for the execution of the transaction.

The transaction monitoring data may also include data describing performance and functionality related aspects of the transaction, like a response time or an indication whether the transaction was successful or erroneous. In addition, the deployed agents may also provide data describing availability and resource usage of components of the monitored system.

Transaction related performance and functionality data and availability and resource usage data provided by agents may contain topology location data identifying a topology location on which the data was measured. This data may continuously be analyzed to identify abnormal operating conditions, like increased service response times or error rates, increased resource usages or unexpected unavailability of components of the monitored computing environments, like processes, host computing systems or services.

As identified abnormal operating conditions are based on monitoring data that has a defined location in the topology model, also the identified abnormal operating conditions can be assigned to the topology location of the monitoring data that indicated them.

After an abnormal operating condition is identified, transaction trace data of transactions that are affected by the abnormal operating condition may be selected. This may be performed by fetching those transactions that passed a topology entity, like a service, which is affected by the abnormal operating condition during the temporal extend of the abnormal operating condition.

The identified, affected transactions may then be traced back to the entry service through which they entered the monitored system, to e.g. identify the entry services that are affected by the abnormal operating condition. Further, web-browser identification data of affected transactions may be analyzed to determine the number of affected web browsers, which represents a good approximation of the affected users. Also available data describing the geolocation of the affected web browsers may be used to determine the geographic distribution of affected users. Browser identification and geolocation data may be provided by web-browser side agents which may be transparently injected into web pages requested and viewed by the users of the monitored system. The transaction monitoring data provided by those web-browser side agents may be integrated with transaction monitoring data from backend/server-side agents to form end-to-end transaction trace data that also contains trace data describing web-browser side activities, including web-browser instance identification and geolocation data.

Other embodiments of the disclosed technology may additionally, for identified affected entry services fetch the number of not affected transactions and relate affected and unaffected transactions for specific entry services to determine an impact score for the affected entry services. The impact score may be a numeric value which describes the impact severity for specific entry services.

Variants of those other embodiments may group affected and unaffected transactions according to various properties of the transaction traces, like the type of the functionality requested from the entry service, the geographic location of the web browser initiating the transaction, type and version of the initiating web browser or the operating system on which the web browser is executed. Impact scores may then be calculated on a transaction group basis.

Yet other embodiments may in addition monitor continuous interactions with the monitored system that are performed by individual web browsers/users. To identify those continuous interactions, web browser agents operating on user web browsers may attach data allowing to identify the individual web browser that initiated a transaction to transaction monitoring data. The browser agents may also monitor the time between consecutive transaction executions on individual web browsers. Transactions originated from the same web browser, for which the time between two consecutive transaction executions is below a certain threshold may be grouped together and those transaction groups may be called visits.

When an abnormal operating condition is identified in those other embodiments and transactions affected by those abnormal operating conditions were identified, visits containing affected transactions may be identified in a next step. An impact rate may be calculated for each identified affected visit, e.g. based on a ratio between affected and not affected transactions contained in a visit.

Further, visits themselves may be marked as affected, based on either a relative or absolute number of affected transactions they contain. When affected visits are identified, also not affected visits may be determined, in a similar way as not affected transactions are identified, as described above. Affected and not affected visits may then be used to calculate visit-based impact rates on an overall basis and also for grouped visits. Criteria to create visit groups may contain but are not limited to the geolocation of the web-browser that performed the visits, type and version of the web-browser and the operating system executing the web browser.

Still other embodiments may, on occurrence of an unexpected operating condition, determine affected and unaffected transactions for an arbitrary service and calculate overall and partial impact scores for the arbitrary service.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

FIG. 1 illustrates a situation in which an abnormal operating condition occurred on a computing component which impacts a subset of transactions that where executed during the existence of the abnormal operating condition.

FIG. 2 provides a block diagram of a transaction monitoring system that both traces transactions and monitors computing components, like services used by those transactions, to detect abnormal operating conditions. On detection of an abnormal operating condition, transactions affected by the abnormal operating conditions are identified and traced back to the users that triggered those transactions. Various analyses are performed to evaluate the severity of the impact that the abnormal operation condition has on users of the monitored application.

FIGS. 3A-D show flow charts of processes performed by modules of the monitoring server on receipt of various type of monitoring data from deployed agents. Monitoring data may include topology data, transaction trace and visit data and non-transaction related measurement data like availability and resource utilization data.

FIGS. 4A-C conceptually describe the categorization of transactions and the calculation of impact scores per transaction category, for one-dimensional and multi-dimensional categories.

FIG. 5 provides a flow chart of a process that continuously analyzes incoming monitoring data to identify abnormal operating conditions and to create corresponding trigger events on identified abnormal operating conditions.

FIG. 6 shows a flow chart of a process that may be performed by an affected transaction filter to identify the end-to-end transaction traces of transactions that are affected by an identified abnormal operating condition.

FIGS. 7A-C provide flow charts of processes that may be performed by an affected user quantifier to analyze the number and the distribution of users and visits that are affected by an abnormal operating condition.

FIG. 8 shows the flow chart of a process that may be executed to identify entry services that are affected by an abnormal operating condition.

FIG. 9 describes a process that calculates the impact rate for an identified affected entry service.

FIG. 10 shows the flow chart of a process that calculates the impact rate for an arbitrarily selected service.

FIG. 11 describes a process which, on identification of an abnormal operating condition, creates an impact heat map for all services that are used by affected transactions.

DETAILED DESCRIPTION

Example embodiments will now be described more fully with reference to the accompanying drawings. The disclosed embodiments are directed to the calculation of the impact that abnormal operating conditions that occurred on maybe not directly customer facing components of a computing system have on the users of the computing system.

In modern application, business logic is often distributed amongst a set of independently deployed and loosely coupled services. Functionality requested by end users is typically produced by a coordinated cooperation of multiple services. In such an environment, a malfunction or unexpected operating condition that occurs on a service that is e.g. not directly related to any customer interaction may be distributed over large portions of a computing system and may indirectly cause adverse, customer affecting effects on other portions of the computing system.

State-of-the art monitoring systems tailored for the needs of applications designed according to the service-oriented architecture (SOA) paradigm, provide monitoring data that describes the service-topology of a monitored system describing the service network that builds the application together with end-to-end transaction trace data that describes the activities performed by services of the monitored system on the basis of individual transaction executions.

This topology and transaction trace data may be used to determine the impact that a malfunction or unexpected operating condition that occurs on a specific service may have on other services or on users that interact with the monitored system while the malfunction or unexpected operating condition persists.

Basically, transactions using the service on which the abnormal operating conditions occurred, while the abnormal operating condition is ongoing may be identified and those transactions may be traced back to the service through which they entered the monitored system to identify entry services that are affected by the abnormal operating conditions occurred. Further, data attached to transaction trace data that identifies individual users, like web-browser identification data may be used to determine the number of affected users.

Various other analyses that are based on the identified affected transactions, the services used by those affected transactions and the users that triggered the execution of those transactions are possible without departing from the spirit and scope of the present disclosure. Representative examples of those analyses are described in the following.

Coming now to FIG. 1 which conceptually describes the service topology of a monitored system during an ongoing abnormal operating condition, combined with a set of transactions that are executed on the system while the abnormal operating condition is ongoing.

An unexpected/abnormal operating condition 150 occurs on a backend service 112. According to known topology data, the service 112 is called from services 115 and 111. This topology data may e.g. be derived from previously monitored transaction executions which contained a call form service 111 or service 115 to service 112. The topology also shows call dependency from entry service 110 to service 111, from entry service 113 to service 114, from service 114 to service 115 and from service 114 to service 111.

According to the topology data, transactions also called from service 115 to service 116 and from service 116 to service 120. A service call relationship is also reported from entry service 113 to service 118 and from service 118 to service 119 which in turn calls service 120. There is also a service call relationship reported from entry service 117 to service 118.

Entry services 110, 113 and 117, internal services 111, 112, 114, 115, 116, 118, 119 and 120 and service call relationships 130, 131, 132, 133, 134, 135, 136, 137, 138, 139, 140 and 141 may have been previously reported by agents deployed to the monitored system or may have been extracted from previously recorded end-to-end transaction traces. In some variant embodiments, one monitored nested service call may be sufficient to establish a service call dependency within the topology model of a monitored environment. Other variants may define a specific threshold of reported nested service calls that needs to be exceeded to create a service call dependency in the topology model and yet other variants may require nested service calls to be continuously reported to keep the corresponding service call dependencies in the topology model.

During the observed unexpected operating condition, users 180, 181, 182, 183 and 184 interact with the monitored system. Users 180 and 181 execute transactions that enter the system via entry service 110 and then call service 111, which in turn calls service 112 on which the unexpected operating condition is observed. Users 180 and 181 do not execute other transactions, as a consequence, all transactions executed by those users are affected by the identified unexpected operating condition. Also, all transactions entering via entry service 110 use service 112. Therefore, both users 180 and 181 and entry service 110 are fully affected by the unexpected operating condition on service 112. In addition, service 111 only performs calls to service 112, therefore also service 111 is fully affected.

User 182 performs two transactions which enter the system via entry service 113. Both transactions continue with a call to service 114. Afterwards one transaction calls service 111 and is therefore affected by the unexpected operating condition, the other transaction calls service 115, followed by service 116 and 120. None of those services is affected by the unexpected operating condition. Therefore, user 182, entry service 113 and internal service 114 are partially affected, because they are involved in the execution of affected and not affected transactions.

No affected transaction is executed on services 115, 116 and 120, therefore those services are not affected by the unexpected operating condition.

User 183 also executes two transactions, one entering via partially affected entry service 113 and one entering via the not affected entry service 117. Both transactions only execute services that are not affected, therefore also user 183 is not affected by the unexpected operating condition.

User 184 executes one transaction which enters via the unaffected entry service 117 and which also subsequently only calls services that are not affected. As a consequence, also user 184 is not affected by the unexpected operating condition.

Referring now to FIG. 2 which provides a block diagram of a monitoring system which in addition to other monitoring tasks, also performs impact analysis tasks for identified unexpected operating conditions on components of the monitored environment.

Agents 200 may be deployed to a monitored environment 201 to perform various monitoring tasks, like providing data describing the topology of the monitored environments, e.g.

in form of topology records 204, data describing transactions performed on the monitored environment, e.g. in form of transaction records 203 or data describing availability states and resource usages from components of the monitored environment, e.g. in form of scalar measurement records.

The monitoring data acquired by the deployed agents may be sent to a monitoring server 205 for analysis, visualization and storage.

Scalar measurement data may be received and processed by a scalar measurement processor component 210 of the monitoring server, which may e.g. create time series data describing the temporal development of resource utilizations that occurred on various components of the monitored environment and of the availability of those components. Example resource utilization measures include CPU, main memory, hard disk, network bandwidth usage of processes or host computing systems. For components performing automatic memory management services, like garbage collection services, those measures may also include the number of performed garbage collection runs and the time required for garbage collection activities. Those measures may be provided for garbage collection activities that temporarily suspended other activities of the process and for garbage collection activities that could be performed in the background. In addition, other maintenance activities performed by monitored processes that may have adverse effects on availability or performance of monitored processes may be observed and reported by agents and described in form of time series data.

Example availability states of host computing systems or processes may include, available, unexpected unavailable, expected unavailable, temporarily unavailable or unknown. The time series data created by the scalar measurement processor 210 out of received scalar measurement records may be stored 211 in a measurement repository 212.

Transaction records 203, which describe fractions of transactions executed by the monitored environment, including portions of the transactions that are executed inside the monitored environment and portions of the transactions that are executed outside the monitored environment, e.g. on web-browsers executing outside the monitored environment that are displaying web content provided by the monitored environment, are received by a transaction trace data processor which combines the transaction trace fragments into end-to-end transaction trace data covering both web-browser side and server-side transaction activities. Agents 200 may also be injected into the distributed web content to also gain visibility into those web-browser side activities. The data provided by those web-browser agents may include, next to transaction execution data, data to identify a specific web-browser, data to determine the geographic location of the web-browser and type and version of the web-browser and the operating system on which the web-browser is executed. The web-browser agents may e.g. read network configuration data of the host computing system that executes the web-browser in which they are executing. This network configuration data may contain also the IP address of the host computing system executing the web-browser which may be used to infer the geographic location of host computing system and web-browser.

End-to-end transaction trace data created by the transaction trace data processor 220 may be stored 221 in a transaction repository 222. A visit analysis component 226 may cyclically scan the transaction repository for new available end-to-end transactions to update visit monitoring data. As explained above, visits may be defined as transactions originated from the same web browser, for which the time between two consecutive transaction executions is below a certain threshold. After a cyclic check for new end-to-end transactions, the visit analyzer may check if the fetched new end-to-end transaction traces contain transaction traces originating from a web-browser for which currently no ongoing visit is open. -New visit record 240 may be created for transaction traces originating from those web-browsers. In case an ongoing visit is open for the web-browser on which a transaction was triggered, the transaction is added to this visit. In case a visit is ongoing, and the time elapsed since the last received transaction from the web-browser of this visit exceeds a certain threshold, the visit may be closed. A new visit will be created for the next transaction that was originated from this web-browser.

Visits may be stored 229 in a visit repository 227 in form of visit records 240, which may contain but are not limited to user discrimination data 241 which identifies the web-browser on which the visit was performed and in turn also the user driving the interaction, and a transaction list 242 which contains the transaction traces describing the visit. In addition, a visit 240 may contain a state indicator indicating whether the visit is still ongoing or already closed.

Topology records 204 are received and processed by a topology data processor 230, which uses to received topology data to incrementally build 231 a topology model 232 of the monitored environment 200.

A service topology and measurement extractor component 224 may also cyclically fetch 223 new transaction traces from the transaction repository 222 for analysis and extraction of service topology and measurement data.

The end-to-end transaction trace data stored in the transaction repository 222 may in addition be analyzed by a service topology and measurement extractor 224 to extract service topology and measurement data from those end-to-end transaction traces. The extracted service topology data may consist of services used by transaction executions and service call dependencies. A transaction execution may e.g. call a first specific service and the execution of this specific service may cause the call of a second specific service. During the analysis performed by the service topology and measurement extractor 224 this call sequence may be identified and the topology model may be updated to indicating a call dependency from the first service to the second service. This service topology data may be integrated with already existing topology data describing processes and host computing systems of the monitored environment to enrich the topology model with data describing the services provided by specific processes.

Measurement data created by the service topology and measurement extractor 224 may describe performance, functionality and resource consumption of individual transactions. Performance measurements may include the response time of the services executed by the transactions and the overall transaction response time as perceived by the user that initiated the transaction. Functionality related measurements may include capturing error indications for the whole transaction execution or for individual service executions. The captured error indications may be used to derive error rate measurements on transaction and service level or number of exceptions thrown and caught during transaction execution. In addition, functionality related measurements may be derived from service and method execution parameters and return values that indicate erroneous behavior. Resource consumption measurements may include CPU or memory usage of individual transactions. The extracted measurement data may be stored in form of time series the measurement repository 212.

It is noteworthy that all time series stored in the measurement repository contain, next to the measurement data consisting of a sequence of tuples of measurement value/measurement time stamp, also meta data describing the semantic of the measurement data, including the type of the measurement and the topology location where the measurement data was observed. An example of such meta data may be "CPU usage of process A", where "CPU usage" describes the meaning of the time service and "process A" describes its topological location.

An anomaly detector 215 continuously monitors 213 the time series data stored in measurement repository to detect unexpected changes of the time series data, like unexpected and rapid increases of service response times or error rates, unexpected rise of CPU or memory usage by processes or host computing systems, or other time series data for which changes may indicate unexpected operating conditions of components of the monitored system. Those components also include the network infrastructure of the monitored system that connects host computing systems and processes of the monitored system. Monitored network related time series may include packed loss, latency or bandwidth time series. Network related time series may also be monitored to identify unexpected changes.

The anomaly detector may also monitor changes of the topology model 232 which indicate expected and unexpected changes of the availability state of components of the topology model.

In case an abnormal operating condition is detected by the anomaly detector, data describing this abnormal operating condition, like the type of the abnormal operating condition, its topological location, the start time of the abnormal operating condition and, if it is already known, the end time of the abnormal operating condition, is forwarded to a trigger event generator 214 which may create a trigger event which describes the abnormal operating condition by its type, topology location and temporal extent.

The trigger event may be forwarded 250 to an affected transaction filter 252 which uses the data of the trigger event to fetch 251 those end-to-end transactions traces from the transaction repository 222 that used services affected by the identified abnormal operating condition during the abnormal operating condition was ongoing. The affected services may be determined based on type and topology location of the identified abnormal operating condition. In case the abnormal operating condition occurred on a specific service, only this specific service is affected. If the abnormal operating condition was detected on a process, all services provided by that process may be affected. When the abnormal operating condition was detected on a host computing system, all services provided by all processes running on the host computing system may be affected.

After the affected services were determined, the affected transaction filter may fetch those transaction traces from the transaction repository that contain an execution of an affected service, where the execution time of the service has a temporal overlap with the temporal extend of the abnormal operating condition. Those identified affected transactions may be forwarded 253 to an affected user quantifier 254 and to an affected entry service selector 257 for further processing.

The affected user quantifier 254 may analyze the received set of affected transactions and extract data identifying the web-browser instances that were used to trigger those affected transactions. As the web-browser instance identification data identifies a specific web-browser and a web-browser is typically operated by a specific user, the number of affected web-browser instances is a good indicator for the number of affected users.

The affected user quantifier 254 may use additional data describing the affected web-browsers, like the geolocation from which the web-browser is operating or type and version of the web-browser and of the operating system on which the web-browser is executed, and additional data describing the individual affected transactions, like the data describing the activity performed by the transaction, for further analysis tasks. Performed analysis tasks may include but are not limited to determining the geographic distribution of the affected users, determining the distribution of the activities performed by those users or forming groups of affected users that share the same geographic location or that execute transactions that perform the same functionality.

Further, the affected user quantifier 254 may select affected visits 240 from the visit repository 227, e.g. by fetching those visits that contain at least one affected transaction. Similar to received affected transactions, also affected visits may be analyzed to determine their geographic and functional distribution.

The affected entry service selector 257 may fetch topology data 258 and use the fetched topology data in combination with the received affected transactions to identify affected entry services. Entry services are those services which form the interface of the monitored environment for interaction with external elements, like users or the web-browsers of users. An entry service is affected when at least one affected transaction entered the monitored environment via the entry service. To identify the affected entry services, the affected entry service selector may follow the received affected transaction traces backwards, against the service call direction, until it reaches the entry service used by the transaction. This entry service may then be identified as affected entry service.

The affected entry service selector 251 may forward both affected transactions and affected entry services to an entry service impact calculator 261.

The entry service impact rate calculator 261 may, for each affected entry service, fetch 260 those transactions that entered the monitored environment while the abnormal operating condition was ongoing, but which did not use a service that was affected by the abnormal operating condition. Those transactions may also be denoted as unaffected transactions. The entry service impact rate calculator 261 may calculate 226 an overall impact score for each entry service based on the affected transactions and unaffected transactions that entered the monitored environment via the same specific entry service. In addition, the entry service impact rate calculator may also group affected and unaffected transactions per entry service according to e.g. the geolocation of the web-browser that initiated the transactions or other grouping criteria enumerated before, like type and version of web-browser and operating system and the type of the functionality requested by the transactions. The entry service impact calculator 261 may also calculate impact scores for each of those transaction groups.

FIG. 3 depicts various processes performed by components of the monitoring server 205 on receipt of monitoring data from agents. FIG. 3a describes the processing of incoming topology data records 204 by a topology data processor. Topology data records may contain data describing and identifying host computing systems, the processed executing on those host computing systems and communication activities performed by those processes. The topology data processor may receive such topology data from various host computing systems of the monitored environment and use received topology data records to incrementally build and update a topology model 232 of the monitored environment 205. The process starts with step 300 when the topology data processor receives a new topology record. Subsequent step 301 updates the topology model 232 according to the reported components and communication activities. Topology entities representing host computing systems and processes may be added to the topology model and communication links describing reported communication activities between topology entities may also be added to the topology model. The topology data of processes may also include data describing services provided by those processes. Step 301 may also update existing topology entities if received topology record data correspond to already known topology entities and contains descriptive data for those entities that differs from the descriptive data currently stored in the topology model. The process then ends with step 302.

The processing of transaction trace data fragments 203 by the transaction trace data processor and the service topology and measurement extractor 224 is described in FIG. 3b.

The process starts with step 310, when a new transaction trace record is received by the transaction trace data processor. Following step 311 may e.g. be performed by the transaction trace date processor 220, which receives transaction trace records 203 from different agents 200 and combines different transaction trace records describing different portions of individual transaction traces into end-to-end transaction trace data. End-to-end transaction trace data describes transaction executions from their origin (e.g. a web browser) over intermediate nodes like e.g. web servers that receive requests from web-browsers multiple services providing requested business logic functionality to backend service nodes, like e.g. databases that persistently store transaction results.

Subsequent step 312 may e.g. be performed by a service topology and measurement extractor 224, which may analyze end-to-end transaction traces created by a transaction trace data processor 220 to identify the services used by the monitored transactions and to extract service call relationships out of the transaction trace data. Service call relationships define dependencies between different services. As an example, the execution of service A by a monitored transaction causes a call to service B. The service topology and measurement extractor 224 may use this observation to extract a service call dependency from service A to service B. The service topology and measurement extractor may add the identified services and their call dependencies to the topology model 232 of the monitored environment.

Following step 313 may further analyze the end-to-end transaction traces to identify entry services provided by the monitored environment. Step 313 may e.g. identify the first service that was called by a monitored transaction and mark this service as entry service. The topology data describing this service may be altered to describe its status as entry service. In other variant embodiments, entry services may be defined by the user of a monitoring system by e.g. selecting service described in the topology model of the monitored environment and marking them as entry service.

In addition to extracting service data from received end-to-end transaction traces, the service topology and measurement extractor 224 may also extract measurement data describing performance and behavior of services used by the monitored transaction. The extracted service measurement data may then be stored in the measurement repository in form of time series data. Each time series may, in addition to data points representing individual measurements, also contain meta data describing the semantics (e.g. response time, error rate) of the time series and its topological location (e.g. identifier of the topology entity in the topology model 232 representing the service that is described by the time series).

The process then ends with step 314.

Coming now to FIG. 3c, which describes the processing of scalar measurement records 202 by the scalar measurement processor 210. The process starts with step 320, when a new scalar measurement record is received by the scalar measurement processor. The scalar measurement record 202 may contain one or more measurement data points, each data point consisting of a measurement value and a measurement time stamp, together with meta data describing the semantics and the topological origin of the measurement data points.

Following step 321 may first query the measurement repository 212 for each measurement data point, whether a time series matching the semantics and topology location meta data of the measurement data point exists. In case no matching time series exists, step 321 may create a new matching time series in the measurement repository 212.

Subsequent step 322 may afterwards append the measurement data point to the time series fetched or created by step 321. The process then ends with step 323.

Referring now to FIG. 3d, which describes the processing of end-to-end transaction data to update visit data. The process is executed cyclically and starts with step 330, e.g. when a specific time period since the last visit update has elapsed. Following step 331 fetches those end-to-end transactions that were finished after the last execution of the visit update process from the transaction repository 222. Afterwards, step 332 checks for each fetched transaction whether an open visit record 240 with matching user discrimination/ web browser identification data 241 is available in the visit repository 227. If such an open visit record is found (i.e. a visit record with matching user discrimination/web browser identification data for which the time since the last recorded transaction belonging to the visit is below a certain threshold), the currently analyzed transaction is appended to the transaction list 242 of the visit record. In case no matching open visit record 240 is found, a new one is created using the user discrimination/web browser identification data of the currently processed transaction record and the currently processed transaction record is added to the transaction list 242 of the created visit record 240.

After processing of all end-to-end transaction traces fetched by step 331 is finished, step 333 is executed, which checks for each open visit, whether the time period since the last reported transaction for the open visit exceeds a maximum inactivity threshold. Open visits for which the time since the last reported transaction with matching user discrimination/web browser identification data exceeds this threshold may be closed by step 333. The process then ends with step 334.

Coming now to FIG. 4, which conceptually describes the identification of affected transaction categories and the determination of overall and category specific impact scores for specific services. Impact scores consider both the number of affected transactions that execute a specific service and also the relative number of all transactions executing the service, which is an indication of the importance of the service for the overall functionality provided by the monitored application. FIG. 4a exemplary depicts portions of category trees for the service functionality and the geolocation categorization dimensions. FIG. 4b illustrates the assignment of affected and total transactions according to those categories. FIG. 4b also outlines a multi-dimensional categorization, exemplary described by a combination of the service functional dimension and the geolocation dimension. FIG. 4b also introduces an impact score, which combines the number of impacted transactions and the number of corresponding total transactions to create an indicator that quantifies the severity that a set of observed affected transactions. The goal is to have a numeric value for the impact score that rises with both the percentage of affected transactions per category (an abnormal situation has "broad" adverse effect on a service or a category of a service), and the total number of transactions ("importance" of the affected service or service category).

FIG. 4c proposes a definition of an impact score that is based on the lower bound of a confidence interval for an estimated impact rate for a service or service category. In agent-based monitoring systems, transaction monitoring data is created by a set mostly autonomously acting agents, therefore the creation of transaction monitoring data scales quite well. However, storage and analysis of the transaction monitoring data is typically performed on a centralized server, which tends to become a bottle neck. In most cases, statistical analyses that are based on a random sample of the received monitoring data provides results with sufficient quality and accuracy. The random sample is typically created by selecting a given percentage (1%, 5% etc.) of received transactions for further processing. Also monitoring data, like the number of transactions that are affected by an abnormal operating condition may be derived from such a random sample. The so calculated number of affected transactions is not an exact value, but a statistical estimation based on the random sample. Statistical estimations are typically defined by an expected/most probable value and a confidence interval that surrounds the expected value. A confidence interval defines the value range in which the real value falls with a specific probability (confidence level). A higher confidence level increases the size of the confidence interval and a higher quality of the estimation (e.g. due to a larger random sample) decreases it. A confidence interval is typically defined by an upper bound that is larger than the expected value and a lower bound that is smaller. A larger random sample increases the quality of the estimations that are based on it and therefore also decreases the size of the confidence interval. As a consequence, the lower bound of the confidence interval is increased and moves nearer to the expected value. The amount of monitoring data for services is determined by the number of transactions processed by those services. The more transactions are processed by a service, the higher is its importance for the monitored application. If more monitoring data is available for a service, also the size of the random sample for the service increases, which increases the quality of the estimation of affected transactions and also increases the lower bound of the confidence interval for this estimation. Therefore, the lower bound of the confidence interval may be used as impact score, as it is both influenced by the estimation of the affected transactions and by importance of the monitored service which is given by the number of transactions processed by the service.

The estimated value has the highest influence on the calculated score, but also the number of total transactions has a desired effect on the impact score. For an estimation result based on a small number of transactions, the confidence interval will be large and its lower bound will also be small. For an estimation result with the same expected value, which is based on a larger number of samples the confidence interval will be smaller. Consequently the lower bound of the confidence interval will be larger and nearer to the expected value. Therefore, a higher number of total transactions/samples (increased "importance") also increases the impact score.

Coming now to FIG. 4a, which exemplary describes hierarchical, multi-level categories for the functionality dimension 400 and the geolocation dimension 410.

The functionality dimension may define a service level 401, which considers services as a whole. The service level has the coarsest granularity level, it does not distinct between different types of functionality requested from a service. The service method group level 402 may distinguish between different types of functionality requested from the service. The example shown in FIG. 4a defines a query, insert and update functionality group. On this level, each service call may be assigned to one of the service method groups. The next finer granularity level is the service method level 403, which further subdivides the service method groups into service methods. For the query group, only the service method "query order data" may be available, for the insert group, the methods "add order" and "add order position" may be available and for the update method group, the method "update order position" may be available.

The geolocation dimension 410 may also define a service level 411, which subsumes all calls to a specific service. The next finer hierarchy level may be the continent level 412, in the example shown in FIG. 4a, there are transactions available for the continents North America and Europe. The next finer country level 413 may show that transactions for the U.S.A and Canada are available for the continent North America and that transactions for the U.K. and Germany are available for Europe. The next finer city level 414 shows that transactions origin from New York, Toronto, London and Berlin.

The data attached to processed transaction trace records also contains data describing the called service method and the geographic location of the browser on which the transaction was triggered. A mapping step 404 and 415 subdivides the received affected and total transactions for a service that were observed during an abnormal operating condition according to their functionality 404 and geolocation 415 categorization data.

The results of these mapping steps are conceptually described as functionality score table 420 and geolocation score table 430. The score tables 420/430 consist of a "category" column 421/431 which identify a specific category, a column for the percentage of affected transactions per category 422/432, a total percentage column 423/433 per category and a score column 424/434 showing the impact score for each identified category.

The first row of each table specifies a category "*", which represents transaction data for a whole service, without a categorization. All other rows represent a specific category on a specific level. The functional score table additionally contains e.g. rows for the service method group level categories "query group" and for the service method level categories "query order data" and "update order position". The geolocation score table contains, next to the "*" category row, the rows for the continent level geolocation categories "North America" and "Europe", a row the country level geolocation categories "Germany" and a row for the city level category "Berlin".

The transaction trace records 203 provided by the agents 200 and the end-to-end transaction trace created out of the transaction trace records contain, next to other data that may be used for other categorizations, sufficient data for a categorization according to the functionality dimension and the geolocation dimension. Therefore, all transactions can be assigned e.g. to a service method level 403 category and a city level 414 category. The values for the column total percentage 423/433 may be calculated by first determining the overall number of transactions executed by a given service and then determining, for each category that is available for the service, the number of transactions that fall into one of those categories. The value for the column total percentage for a given service and a given category may then be calculated by dividing the number of transactions for the given category by the overall number of transactions and multiplying the result with 100. As an example, the total number of transactions for a specific service may be 100 and 60 of those transactions may have an origin in North America. As a consequence, the value for the total percentage column 423/433 for the row "North America" would be 60%.

Further, from the 60 transactions from North America, 3 transactions may be affected by an identified abnormal operating condition. Those 3 transactions represent 5% of the total transactions with an origin from North America. As a consequence, the percentage of affected transactions for North America is 5%. As the "*" row for each dimension table represents all transactions processed by the analyzed service during the time an abnormal operating condition was observed, the value of the total percentage 423/433 column is always 100% for the "*" row.

The values for the impact score column 424/434 may be calculated for each category based on the importance of the category (i.e. the number/percentage of total transactions of the specific category) and the grade to which the category is affected by an abnormal operating condition (i.e. the number/percentage of affected transactions of the specific category). The desired impact score should consider both the importance of a given service or service category, which is best described by the relative or absolute number of transactions that use a service and/or fall into a specific service category, and the severity of the impact that a certain abnormal operating condition has on the service/service category, which is best described by the relative or absolute number of transactions executed by the service/service category that are affected by an abnormal operating condition. Both a raise of importance of a category and of the grade to which the category is affected by the abnormal operating condition should increase the impact score. In other words, for two services which show the same relative number of affected transactions, but one service executes a higher percentage of all transactions than the other on, the severity score for the service executing the higher percentage of overall transactions should be higher than the severity score for the other service. An exemplary method to determine the impact score is described in FIG. 4c.

After tables for different dimensions 420/430 are created, they may be combined 425/436 into tables representing multiple category dimensions, like the exemplary functionality/geolocation score table 440 shown in FIG. 4b. Such a multidimensional table may contain rows for all combinations of categories from the dimension tables that were used to create it. For the exemplary functionality/geolocation score table 440, those rows may contain a row "*" for all transactions, a row query group/Europe for all transactions that use functionality of the group query and that are originated from a web browser in Europe. A multi-dimensional table also consists in columns identifying a (multi-dimensional) category 441, the percentage of affected transactions for the category 442, a percentage of the total number of transactions of the category 443 and an impact score for the category 444. The impact score for multi-dimensional categories may also be calculated as described in FIG. 4c.

Coming now to FIG. 4c, which conceptually describes the determination of an impact score for a given category of a service that was impacted by an observed abnormal operating condition. As discussed earlier, the amount of monitoring data created by modern agent-based monitoring system is most times too big for exact calculations that consider all monitoring data. Therefore, various measures are applied to reduce the amount of monitoring data that is analyzed, like randomly selecting sample data from the received monitoring data and only using those samples for subsequent analyses. Reservoir sampling is a method that may be used for this purpose. As a consequence, the number of affected transactions for a given service category is not an exact value, but an estimation of the real value. Such an estimation is defined by the most probable or expected value, and a confidence interval which describes the quality of the estimation by specifying a value range in which the real value lies with a certain probability (confidence level). Typically, the confidence interval extends symmetrically from the expected value. The more samples are available for the estimation, the higher is the quality of the estimation and the smaller is the confidence interval. A smaller confidence interval also leads to a higher lower border of the confidence interval. The higher the number of total transactions for service category is, the more samples are available for the estimation of the amount of affected transactions.

As a consequence both estimated amount of affected transactions, and the amount of transactions used to produce this estimate has an impact on the lower border of the confidence interval of the estimation. The lower border of the confidence interval increases when the expected value of the estimation rises, as the expected value "drags" the confidence interval on changes and the lower border of the confidence interval increases also when the amount of transactions used to calculate the amount of affected transactions (amount of total transactions) raises, as this improves the quality of the estimate and decreases the size of the confidence interval. Therefore, the lower border of the confidence interval for the estimation of the amount of affected transactions for a service category is a good candidate for the impact score.

FIG. 4c shows two scenarios for which a percentage of 65% affected transaction is estimated. In the first scenario 450, the estimation is based on about 100 transactions, leading to a relatively large confidence interval 452 with a lower border 454 in the range of about 35%. The second scenario 451 describes an estimation that also results in an expected value of 65%, but in this case the estimation is based on about 1000 transactions. As a consequence, the confidence interval 453 is much smaller in the second scenario and the lower bound 455 of the confidence interval is much higher, about 60%. This also shows that the lower border of the confidence interval fulfills the requirement to create a higher impact score for more important categories for which the number of executed transactions is higher.

Coming now to FIG. 5 which provides a flow chart of a process that constantly observes and analyzes incoming monitoring data from a monitored environment to identify and localize abnormal operating conditions. Detected abnormal operating conditions may be reported in form of a trigger event which describes the type of the abnormal operating condition (e.g. unexpected increase of response time or error rate for a service, unexpected increase of CPU or memory consumption of processes or host computing systems/operating systems, low disk space, unexpected decrease of network bandwidth or unexpected unavailability of processes or host computing systems), the temporal extend of the abnormal operating condition, e.g. in form of a start time and an end time of the abnormal operating condition and a topological location of the abnormal operating condition which localizes it within the topology model of the monitored environment and identifies the topology entity (e.g. operating system, process or service entity) on which the abnormal operating condition was observed. The process starts with step 500, when the monitoring system is started, and agents 200 begin to send monitoring data to the monitoring server. Following step 501 observes reported changes of the topology, which may e.g. indicate an unexpected unavailability of components of the monitored environment, like processes or host computing systems. Step 501 may further observer measurement data extracted from end-to-end transaction traces to e.g. identify unexpected increases of response times or error rates on services used by those transactions, and step 501 may also analyze scalar measurement data received from agents, which describes resource usages by individual components, like CPU, main memory or hard disk usage by specific components, or an unexpected increase of network latency or decrease of network reliability, e.g. in form of an increased packet loss rate. Step 501 may e.g. observer time series data to identify changes of measurement data that cannot be explained by random, statistical fluctuations but indicate a substantial change of the monitored components. Systems for automatic, adaptive baseline determination may be used by step 501 to determine normal ranges for monitoring data and to identify abnormal situations or operating conditions when the received measurement data lies outside these normal ranges for a longer period of time.

Decision step 502 constantly checks whether an abnormal operating condition was identified by step 501, and in case one was identified, continues with step 503. Otherwise, the process returns to step 501.

Step 503 may use the topology model data to identify those services that are affected by an identified abnormal operating condition. The processing performed by step 503 depends on the location of the abnormal operating condition. In case the location is a service, the service that is directly affected by the abnormal operating condition is already identified. This may be the case for abnormal operating conditions describing an increased response time or error rate for a specific service. In case an abnormal operating condition is detected on a process, step 503 may use the topology model to identify services that are provided by the process on which the abnormal operating condition was reported. In case the abnormal operating condition is located on a host computing system, step 503 may identify all services provided by all processes executing on the host computing system as affected services.

Following step 504 calculates the temporal extend of the abnormal operating condition, e.g. by identifying the point in time when the abnormal operating condition was first observed as its start time, and the last point in time when the abnormal operating condition was observed, e.g. when the corresponding measurement data returns to a normal range, as end time of the abnormal operating condition. Some longer lasting abnormal operating conditions may still be ongoing when step 504 is executed and no end time of the abnormal operating condition may be available at this time. In such cases, the current time may be assumed as end time of the abnormal operating condition for all subsequent analysis steps, until finally the abnormal operating condition is no longer observed, and an end time can be determined.

Subsequent step 505 creates a trigger event which describes type, service topology location and temporal extend of the observed abnormal operating condition. In case the abnormal operating condition was observed on a process or on a host computing system and multiple services are affected, step 505 may create a trigger event for each service. In this case, also data describing the original observed abnormal operating condition may be added to the trigger event.

Subsequent step 506 provides the created trigger event, or multiple trigger events for further processing, e.g. by an affected transaction filter 252.

Some embodiments of the trigger event generator 214 may, in addition to monitoring measurement and topology data for emerging abnormal operating conditions and creating corresponding trigger events, also monitor measurement and topology data indicating an already ongoing abnormal operating conditions to identify the point in time when an abnormal operating condition ends and normal, expected operating conditions return. Those embodiments may e.g., on detection that a monitored abnormal operating condition ended, also trigger an impact analysis for the just ended abnormal operating condition.

Coming now to FIG. 6, which provides the flow chart of a process that may be used to identify the end-to-end transaction traces of transactions that are affected by an abnormal operating condition described by a trigger event. The process starts with step 600, when the affected transaction filter 252 receives a trigger event. Following step 601 may fetch those end-to-end transaction traces from the transaction repository 222, which have a temporal overlap with the temporal extend of the reported abnormal operating condition. Step 601 may e.g. fetch those transactions that either started or ended during the temporal extend of the abnormal operating condition or that started before and ended after the temporal extend of the abnormal operating condition.

Subsequent step 602 may further filter the transaction traces fetched by step 601 by selecting those transactions that executed the affected service during the temporal extend of the abnormal operating condition. The end-to-end transaction traces selected by step 602 describe those transactions which used the affected service while the abnormal operating condition was ongoing. Step 603 provides the identified affected end-to-end transaction traces for further processing, e.g. by an affected user quantifier module 254 or an affected entry service selector 257. The process then ends with step 604.

Referring now to FIG. 7, which provides flow charts of processes that may be executed by the affected user quantifier 254 to determine the number of affected users, impact rates for users and the number of visits that are affected by a reported abnormal operating condition. FIG. 7*a* provides a flow chart of a process that determines quantities of users that are affected by an identified abnormal operating condition because they executed transaction that were affected by the abnormal operating condition. The process starts with step 700, when a set of affected transactions is received by the affected user quantifier. Following step 702 may extract user discrimination data from the received transaction traces. As discussed earlier, the monitoring system may also inject agents to web content that is transferred by the monitored environment to web browser operated by users of the monitored environment. Those agents monitor and report web browser side activities. The monitoring data provided by those web browser side agents also contains data that uniquely identifies the web browser instance on which the monitored activity occurred. As a consequence, the number of different web browser identifiers reported by a set of transaction traces is an indicator for the number of different web browsers that were used to trigger those transactions, which is also an indicator for the number of different users that were involved in the execution of the transactions. As an example, in a set of e.g. 100 transactions, all transactions may contain the same web browser identification data. This is an indication that all transactions were triggered by the same users. In another sample of 100 transactions, each transaction may contain different web browser identification data. This is an indication that 100 different users triggered those transactions.

Step 702 may determine the number of different web browser identification/user discrimination data and provide this number as total number of affected users for subsequent visualization and analysis. Step 702 may also determine the number of all users that interacted with the monitored application during an observed abnormal operating condition, regardless if they were affected by the abnormal operating condition and relate this number to the number of affected users. Step 702 may in addition create statistical data describing the relation between affected transactions and affected users, like determining the minimum, maximum and average number of affected transactions that were executed by an affected user. This statistical data may also be provided for subsequent visualization and analysis.

Following step 703 determines quantities of affected users for different categories of the affected transactions. As discussed earlier, transactions may be categorized according to various hierarchical category sets for different categorization dimensions, like the functionality performed by the transaction or the geolocation of the web browser that was used to trigger the transaction. Information to determine the exact category of each transaction is available in the transaction traces. Therefore, step 703 may group the received affected transaction using their category data. Step 703 may consider only one categorization dimension to group affected transactions and create e.g. transaction groups that contain all transactions that preformed a specific functionality, or groups of transactions that were initiated by browsers situated in specific geolocations, In addition, step 703 may consider multiple categorization dimensions for the grouping of transactions and e.g. create transaction groups containing transactions that performed a specific functionality that were in addition initiated by web browser situated in specific geolocations. Transaction groups that were created considered only one categorization dimension may be referred to as one-dimensional transaction groups and transaction groups that are identified using multiple categorization dimensions are referred to as multi-dimensional transaction groups.

Following step 704 may process each group of transaction created by step 703 and calculate data of affected users per category as described in step 702. The calculated data of affected users by transaction category may also be provided for subsequent visualization and analysis. The process then ends with step 705.

Coming now to FIG. 7b, which may calculate, for specific a identified affected user (e.g. by using a specific user discrimination/web browser identification data identifying an affected user as determined by step 702 of the process described in FIG. 7a) an impact rate of the observed abnormal operating condition by fetching all transactions executed by the specific user while the abnormal operating condition was ongoing and compare the number of affected transactions and the number of the not affected transactions for the specific user.

The process starts with step 710 when specific user discrimination/web browser identification data was received. Following step 711 select those affected transactions that have user discrimination/web browser identification data that matches the received user discrimination/web browser identification data. The affected transactions may be received from the affected transaction filter 252. Subsequent step 712 may fetch transactions with user discrimination/web browser identification data matching the received user discrimination/web browser identification data that were executed while the abnormal operating condition was ongoing, but which are not affected by the abnormal operating condition. Step 712 may e.g. fetch transaction traces from the transaction repository 222 which where executed during the abnormal operating condition, which also have matching user discrimination/web browser identification data, and which do not contain a call to the service affected by the abnormal operating condition.

Following step 713 may calculate an impact rate for the specific user as ratio of affected transactions to not affected transactions of the user. Variant embodiments may also use the ratio of affected transactions to all transactions of the user as impact rate. The process then ends with step 714.

Coming now to FIG. 7c, which describes processing performed to determine the number of visits performed by a specific user that were affected by an abnormal operating condition. The process may also calculate an impact rate for the visits of the specific user.

The process starts with step 720 when user discrimination/web browser identification data for a web browser that triggered at least one affected transaction was received. The identification of such user discrimination/web browser identification data may be performed as described in step 701 of the process described in FIG. 7a. Afterwards, step 721 may be executed which fetches visits 240 from the visit repository 227 which have a matching user discrimination/web browser identification data and which were at least partially executed during the abnormal operating condition was ongoing. Following step 722 analyzed the transaction lists 242 of the fetched visits to identify those visits which contain at least one affected transaction. Step 722 may e.g. compare the transactions in a visit list with the affected transactions identified by the affected transaction filter. In case at least one of the transactions in the transaction list is also contained in the list of affected transaction, the visit may be marked as affected. Subsequent step 723 may calculate a visit impact rate either as ratio between affected and not affected visits or as ratio between affected visits and all visits. The process then ends with step 724.

Referring now to FIG. 8, which describes the identification of entry services that are affected by an abnormal operating condition based on previously identified transactions that are affected by the abnormal operating condition. As discussed earlier, modern applications are typically created as network of loosely coupled services that interact with each other to provide a desired business functionality. Among those services are internal services, which are only accessible via other services of the application, and entry services which provide an interface for external users to interact with the application. Transactions typically enter the application via those entry services. As those entry services represent the application to its users, knowledge about the status of those entry services is vital for an operator of an application to e.g. timely implement counter measures when problems emerge on such an entry service. As an example, if an observed abnormal operating condition has an impact on a specific entry service of an application, and the operator of the application gets aware of this fact in time, he may e.g. redirect incoming traffic to other, equivalent entry services that are not affected by the abnormal operating condition to minimize potential adverse effects on the end users of the application.

The process starts with step 800, when the affected entry service selector 257 receives a set of affected transactions, e.g. from an affected transaction filter 252. The process is executed for each received affected transaction. Following step 801 first fetches the services that are used by the currently processed affected transaction, e.g. by querying the transaction trace data for identification data of services executed by the transaction. Afterwards, step 801 selects those services that were used by the affected transaction that are also entry services. To identify the entry services, step 801 may e.g. use data stored in the topology model of the monitored environment, which contains data that distinguishes entry services from internal services. Step 801 may e.g. fetch additional data describing the services used by the affected transaction from the topology to identify the entry service used by the transaction. Another variant of step 801 may analyze the transaction trace to identify the first service used by the affected transaction and select this first used service as entry service. Following step 802 may add the entry service identified by step 801 to a set of affected entry services. The processing of the current affected transaction then ends with step 803. After the process was executed for all received affected transactions, the set of affected entry services populated by step 802 contains all entry services that were used by affected transactions. The identified set of affected entry services may then be forwarded for subsequent visualization and analysis, e.g. to an entry service impact rate calculator 261.

Referring now to FIG. 9, which describes a process that calculates an impact rate for entry services that are affected by an abnormal operating condition. The process starts with step 900 when a set of affected entry services (e.g. identified by the affected entry service selector 257, as described in FIG. 8) and a set of affected transactions (e.g. identified by an affected transaction filter 252, as described in FIG. 6) is received by the entry service impact calculator 261. The process is executed for each affected entry service contained in the received set of affected entry services. Step 901 fetches the affected transactions that used the currently processed entry service. Following step 902 fetches transaction trace data for not affected transactions from the transaction repository 222. Not affected transactions are in this context transactions that were executed during the abnormal operating condition, that entered the monitored application via the currently processes affected entry service, but that were not otherwise affected by the abnormal operating condition because they used no other service that was affected by the abnormal operating condition.

Subsequent step 903 calculates an impact rate for the currently processed affected entry service, e.g. as the ratio between affected transactions and not affected transactions using the entry service or as ratio between affected and all transactions using the entry service.

Afterwards, step 904 may calculate an impact score for the entry service that takes both the amount of affected and total transactions entered via the entry service into account. The lower bound of a confidence interval for the estimation of the impact rate may be used as impact score. The rationale for selecting the lower bound of the confidence interval as impact score was already discussed in FIG. 4.

Following step 905 fetches the categorization data for the currently processed entry service (e.g. service method groups, service methods provided by the entry service) and for the affected transactions that used the currently processed entry service (e.g. geolocation categories for web browsers that initiated the transactions).

Step 906 may afterwards calculate impact rate and impact score for various one-dimensional and multi-dimensional categories that are available for the currently processed entry service and the affected transactions using this entry service. The calculated rates and scores for the categories are based on subsets of affected transactions and not affected transactions that match the respective category.

Following step 907 sorts the categories that are available for the currently processed entry service and its corresponding affected transactions for which an impact score could be calculated (i.e. categories for which affected transactions are available), ascending according to their calculated impact score.

Subsequent step 908 may select top findings of impacted categories for the entry service e.g. as categories with an impact score above a certain threshold, or as the n categories (where n may be configurable, example values for n include 5, 10 or 20) with the highest impact score. Calculated impact rates and impact scores and the list of top findings may be provided for subsequent visualization and analysis. The process then ends with step 909.

Referring now to FIG. 10, which describes the calculation of values quantifying the impact that an observed abnormal operating condition has on an arbitrary service. The process starts with step 1000, when a specific selected service together with a set of affected transactions as e.g. identified by the affected transaction filter 252 are received.

Subsequent step 1001 may filter those affected transactions that executed the service for which impact data should be calculated before they used the service which was directly impacted by the observed abnormal operating condition. The rationale behind this filtering step is that impact always travels against service call direction. As an example, execution of service A requires functionality of service B and therefore service B is called during the execution of service A. Service B may in turn call service C. An abnormal condition on service B, e.g. in form of an increased response time, propagates to service A and also increases the response time of service A. However, the increased response time of service B has no impact on service C. The filtering performed by 1001 may also reveal that no affected transaction used the selected service before the affected service was called. In this case, the process may end prematurely and indicate that the selected service was not impacted by the abnormal operating condition. Otherwise, step 1002 is executed, which fetches not affected transactions that were executed during the abnormal operating condition that used the selected service. Subsequent steps 1003, 1004 and 1005 calculate impact rate and impact score for the whole selected service and for available categories of the service and its corresponding affected transactions and identify top finding categories based on the calculated impact scores as already described in steps 903 to 908 of the process shown in FIG. 9. The process then ends with step 1006.

Coming now to FIG. 11, which describes a process that creates data to augment the topology model with impact score data calculated for all services to create an impact heat map view of for individual abnormal operating conditions that shows how the impact of an abnormal operating condition is distributed amongst the services of a monitored environment.

The process stats with step 1100, when an impact map calculator component receives a request to calculate an impact heat map for a set of affected transactions that may be contained in the request. Following step 1101 determines the set of services that is used by the affected transactions, step 1101 may also fetch the topology entities representing those services in the topology model 232 of the monitored environment 201.

Subsequent step 1102 may calculate the impact rate for each service determined by step 1101, by selecting the affected transactions using the service, determining then not affected transactions using the service during the abnormal operating condition, and calculating an impact rate for the service as the ratio of affected to not affected transactions, or the ratio of affected transactions to all transactions (affected+not affected transactions) using the service.

Following step 1103 may use visualization techniques like color coding or size changes of icons representing services in a topology visualization of service dependencies to display the impact rate of all affected services in a topology visualization. The process then ends with step 1104.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for reporting impact of an abnormal operating condition in a distributed computing environment, comprising:

receiving, by a monitoring server, transaction events from one or more agents and storing the transaction events in a transaction repository residing on the monitoring server, where the one or more agents are instrumented in applications executing computer transactions in the distributed computing environment and the one or more agents generate the transaction events by monitoring performance of the applications during execution of the computer transactions in the distributed computing environment, where the transaction events for a given computer transaction account for sequence of service calls performed by the given computer transaction;

detecting an abnormal operating condition event in the distributed computing environment;

identifying topological location of the abnormal operating condition event in the distributed computing environment;

identifying computer transactions that overlap temporally with the abnormal operating condition event and that are at least partially executed on the topological location of the abnormal operating condition event, where the computer transactions are executed in the distributed computing environment;

from the identified computer transactions, identifying entry services affected by the abnormal operating condition event using the sequence of service calls performed by the identified computer transactions, where the entry services provide an interface for users to interact with an application and the application implements at least a portion of a particular computer transaction and an entry service is first service called by the particular computer transaction according to the sequence of service calls performed by the identified computer transactions; and for each identified entry service, quantifying an impact of the abnormal operating condition event on the identified entry service by computing an impact rate for a given entry service as a ratio between the number of computer transactions which use the given entry service are affected by the abnormal operating condition and the number of computer transactions which use the given entry service, that overlap temporally with the abnormal operating condition and are not affected by the abnormal operating condition.

2. The method of claim 1 further comprises receiving, by a monitoring server, topology record events from one or more agents and storing the topology records in a topology model, where the one or more agents are instrumented in applications executing computer transactions in the distributed computing environment, the one or more agents generate the topology record events by monitoring portions of the network topology of the distributed computing environment, and the topology model includes topology entities which collectively describe a network topology of the computing resources comprising the distributed computing environment.

3. The method of claim 1 wherein identifying topological location of the abnormal operating condition event further comprises determining services that are affected by the abnormal operating condition, where determining service that are affected by the abnormal operating condition is based on the topology model.

4. The method of claim 1 wherein detecting an abnormal operating condition event further comprises monitoring, by an anomaly detector residing on the monitoring server, measurement values of a time series and generating a triggering event when the measurement values exceed a threshold, where the triggering event includes a start time for the abnormal operating condition, an end time for the abnormal operating condition and a topological location for the abnormal operating condition in the distributed computing environment.

5. The method of claim 4 wherein identifying computer transactions that overlap temporally with the abnormal operating condition event further comprises retrieving computer transactions from a transaction repository, where the retrieved computer transactions have at least one of a start time which falls between the start time for the abnormal operating condition and an end time for the abnormal operating condition, an end time which falls between the start time for the abnormal operating condition and an end time for the abnormal operating condition, and a start time which falls before the start time for the abnormal operating condition and an end time which falls after the end time for the abnormal operating condition.

6. The method of claim 5 wherein identifying entry services affected by the abnormal operating condition event further comprises, for each identified computer transaction, retrieving services used by a given computer transaction from the transaction repository, identifying an entry service from the retrieved services, and adding the identified entry service to a list of entry services affected by the abnormal operating condition.

7. The method of claim 6 wherein identifying an entry service from the retrieved services further comprises querying topology data in a topology model, where the topology model includes topology entities which collectively describe a network topology of the computing resources comprising the distributed computing environment.

8. The method of claim 1 wherein quantifying an impact of the abnormal operating condition event further comprises, for each entry service in the list of entry services, computing a confidence interval for the impact rate and setting a lower bound of the confidence interval as an impact score for a given entry service.

9. The method of claim 1 further comprises categorizing the identified computer transactions by an attribute of the identified computer transactions captured by agents, and quantifying an impact of the abnormal operating condition event on the identified entry service in each category of computer transactions.

10. The method of claim 1 further comprises categorizing the identified computer transactions by one of functionality performed by the identified entry service or geolocation of a web browser used to initiate the computer transaction, and quantifying an impact of the abnormal operating condition event on the identified entry service in each category of computer transactions.

11. A computer-implemented method for reporting impact of an abnormal operating condition in a distributed computing environment, comprising:

receiving, by a monitoring server, transaction monitoring data from one or more agents and storing the transaction monitoring data in a transaction repository residing on the monitoring server, where the one or more agents are instrumented in applications executing computer transactions in the distributed computing environment and the one or more agents generate the transaction monitoring data by monitoring performance of the applications during execution of the computer transactions in the distributed computing environment;

generating, by browser agents, unique browser identifiers and attach the unique browser identifiers to requests sent by web browsers, where the requests trigger execution of the computer transactions and the transaction monitoring data includes the unique browser identifiers for the web browsers and the browser agents are instrumented in the applications executing the computer transactions in the distributed computing environment;

detecting an abnormal operating condition event in the distributed computing environment;

identifying topological location of the abnormal operating condition event in the distributed computing environment;

identifying computer transactions that overlap temporally with the abnormal operating condition event and that are at least partially executed on the topological location of the abnormal operating condition event, where the computer transactions are executed by applications in the distributed computing environment;

extracting user discrimination data from the identified computer transactions, where the user discrimination data groups computer transactions executed by the same user; and from the identified computer transactions and the user discrimination data, quantifying a number of users affected by the abnormal operating condition by determining a number of unique identifiers for web browsers used to initiate one of the identified computer transactions, where the user discrimination data is defined as an identifier for a web browser used to initiate one of the identified computer transactions.

12. The method of claim 11 further comprises receiving, by a monitoring server, transaction events from one or more agents and storing the transaction events in a transaction repository residing on the monitoring server, where the one or more agents are instrumented in applications executing computer transactions in the distributed computing environment and the one or more agents generate the transaction events by monitoring performance of the applications during execution of the computer transactions in the distributed computing environment.

13. The method of claim 11 further comprises receiving, by a monitoring server, topology record events from one or more agents and storing the topology records in a topology model, where the one or more agents are instrumented in applications executing computer transactions in the distributed computing environment, the one or more agents generate the topology events by monitoring portions of the network topology in the distributed computing environment, and the topology model includes topology entities which collectively describe a network topology of the computing resources comprising the distributed computing environment.

14. The method of claim 12 wherein detecting an abnormal operating condition event further comprises monitoring, by an anomaly detector residing on the monitoring server, measurement values of a time series and generating a triggering event when the measurement values exceed a threshold, where the triggering event includes a start time for the abnormal operating condition, an end time for the abnormal operating condition and a topological location for the abnormal operating condition in the distributed computing environment.

15. The method of claim 14 wherein identifying computer transactions that overlap temporally with the abnormal operating condition event further comprises retrieving computer transactions from a transaction repository, where the retrieved computer transactions have at least one of a start time which falls between the start time for the abnormal operating condition and an end time for the abnormal operating condition, an end time which falls between the start time for the abnormal operating condition and an end time for the abnormal operating condition, and a start time which falls before the start time for the abnormal operating condition and an end time which falls after the end time for the abnormal operating condition.

16. The method of claim 11 further comprises categorizing the identified computer transactions by an attribute of the identified computer transactions captured by agents, and quantifying a number of users affected by the abnormal operating conditions in each category of computer transactions.

17. The method of claim 11 further comprises categorizing the identified computer transactions by one of functionality performed by the computer transaction or geolocation of a web browser used to initiate the computer transaction, and quantifying a number of users affected by the abnormal operating conditions in each category of computer transactions.

18. The method of claim 11 further comprises quantifying an impact of the abnormal operating condition on a particular user.

19. The method of claim 18 further comprises quantifying an impact of the abnormal operating condition on a particular user by computing an impact rate as a ratio between the number of computer transactions associated with the particular user which are affected by the abnormal operating condition and the number of computer transactions associated with the particular user which are not affected by the abnormal operating condition.

20. The method of claim 12 further comprises
designating computer transactions which originated from same web browser within predefined time period as a visit;
retrieving visits for a particular user which occurred during the abnormal operating condition;
comparing the computer transactions which comprise the retrieved visits with the identified computer transactions that overlap temporally with the abnormal operating condition and that are at least partially executed on the location of the abnormal operating condition event;
labeling a given retrieved visit for the particular user as affected when a computer transaction comprising the given retrieved visit matches one of the identified computer transactions; and
quantifying a number of visits for the particular user impacted by the abnormal operating condition.

21. The method of claim 20 further comprises quantifying an impact of the abnormal operating condition on a particular user by computing an impact rate as a ratio between the number of visits associated with the particular user which are affected by the abnormal operating condition and the number of visits associated with the particular user which are not affected by the abnormal operating condition.

* * * * *